United States Patent

Berry et al.

[15] 3,673,592
[45] June 27, 1972

[54] LOCKOUT FOR PORTABLE APPLIANCE WITH CASTER JACK MECHANISM

[72] Inventors: William R. Berry; Reinhold A. Drews, both of Stevensville; Julius J. Grau, Berrien Springs, all of Mich.

[73] Assignee: Whirlpool Corporation, Benton Harbor, Mich.

[22] Filed: Aug. 21, 1970

[21] Appl. No.: 65,885

[52] U.S. Cl...............................340/283, 340/220, 340/280, 200/52, 200/61.58
[51] Int. Cl........................................................G08c 21/00
[58] Field of Search................340/283, 220, 271, 280, 268, 340/421; 200/85, 61.41, 61.42, 61.58, 52 R, 61.44, 61.46, 61.89; 15/320, 328

[56] References Cited

UNITED STATES PATENTS

| | | | |
|---|---|---|---|
| 3,161,852 | 12/1964 | Timm | 340/421 |
| 3,285,036 | 11/1966 | Erickson | 200/61.58 |
| R23,896 | 11/1954 | Higgins | 340/220 |
| 2,466,355 | 4/1949 | Baker | 340/280 |
| 2,974,345 | 3/1961 | Krammes | 200/52 |

Primary Examiner—John W. Caldwell
Assistant Examiner—Marshall M. Curtis
Attorney—James S. Nettleton, Thomas E. Turcotte, Donald W. Thomas, Gene A. Heth, Franklin C. Harter, Anthony Niewyk, Robert L. Judd and Hill, Sherman, Meroni, Gross & Simpson

[57] ABSTRACT

Portable appliance of the type in which a cabinet is supported on a frame having retractable caster wheels, the appliance being provided with a switch which is operable by movement of the wheels into a cabinet raising position, the switch functioning to prevent energization of the appliance when the cabinet is elevated, as well as to afford a signal.

5 Claims, 2 Drawing Figures

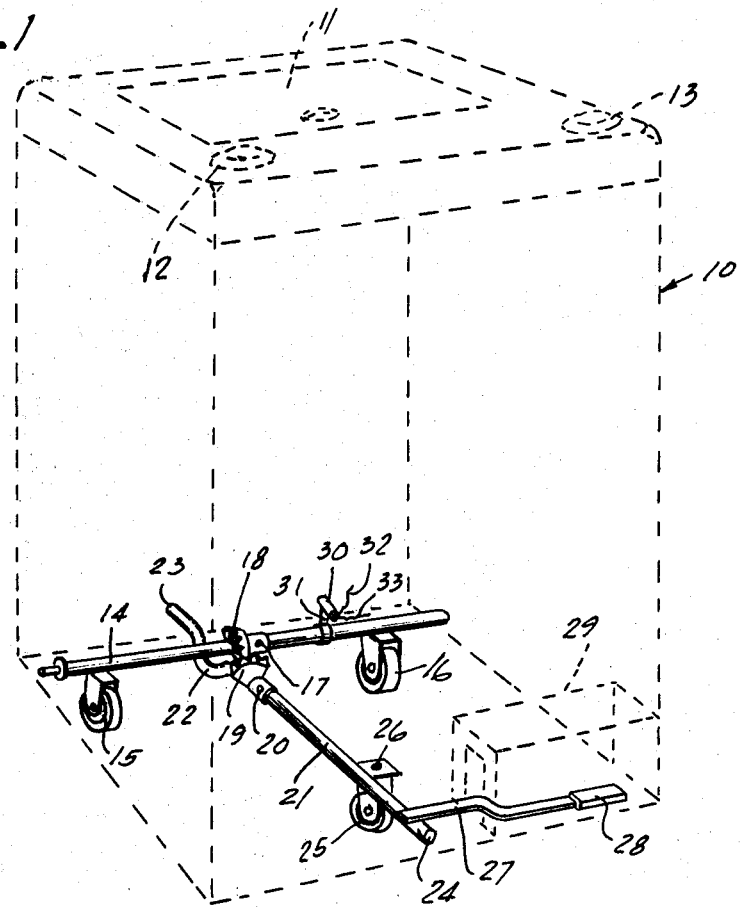

LOCKOUT FOR PORTABLE APPLIANCE WITH CASTER JACK MECHANISM

CROSS-REFERENCE TO RELATED APPLICATION

Although the mechanism of the present invention is not limited to a particular form of caster jack mechanism, the description of the preferred embodiment will be made in conjunction with that type of caster jack mechanism which is shown and claimed in Drews and Grau co-pending application Ser. No. 29,389 filed Apr. 17, 1970.

BACKGROUND OF THE INVENTION

1. Field of the Invention

This invention is in the field of portable appliances such as washing machines, driers or the like which are arranged to rest flat on the floor during operation, and which are provided with a caster jack mechanism whereby the frame of the appliance is lifted from the floor and supported on caster wheels for movement to a new location. The invention is particularly concerned with an electrical system for disabling the energizing circuit to the appliance while the appliance is supported on the caster jack mechanism.

2. Description of the Prior Art

For heavy appliances such as automatic washers or driers, it is convenient to incorporate a caster jack mechanism as part of the frame to enable the user to roll the appliance to a different position for operation and storage or when it becomes desirable to clean under or behind the appliance. The caster jack mechanism of the aforementioned co-pending Drews and Grau application is an example of one such mechanism. When employing such a caster jack mechanism, however, it is important that the appliance be disabled from energization with the caster jack mechanism in the cabinet supporting position. Otherwise, energization of the appliance while supported on the caster wheels could cause the machine to travel from its operation position in such a manner as to cause damage to the machine, to the walls or place undue strain on the fluid supply hoses or the power supply cords for the machine.

Portable appliances having switches combined with the control circuit for the appliance, the switches being operated by the wheels of the appliance are known in other types of environments, as evidenced by U.S. Pat. Nos. 2,035,481; 2,590,152; and, 2,974,345. The first-named patent describes a combination washer-drier which is protected against excessive vibration of the machine during spin drying utilizing a switch assembly which operates off one leg of the machine. In U.S. Pat. No. 2,590,152, there is described a vacuum cleaner combined with an ultraviolet light whereby lifting the sweeper from the floor causes the ultraviolet light to be de-energized. In U.S. Pat. No. 2,974,345, there is disclosed a collapsible support for an appliance in which a switch is operated by movement of a wheel into and beyond its normal position.

SUMMARY OF THE INVENTION

The portable appliance of the present invention provides a switch means which is responsive to the position of the caster jack mechanism, the switch being connected in the control circuit of the appliance so as to prevent energization of the appliance when the caster jack mechanism is supporting the cabinet, and also to energize a signal means to indicate to the operator that the machine must be lowered to its operative position off the caster wheels before the appliance can be energized. In a particularly preferred embodiment of the present invention, a position sensitive switch is employed in conjunction with the caster jack mechanism, the switch being in series with a relay coil having a switch contact disposed in the main energizing circuit for the appliance. Present day washing machines frequently include a so-called kickout relay which is actuated by a condition of excessive vibration to de-energize the energizing circuit to the appliance when a condition of dynamic unbalance occurs. The position sensitive switch of the present invention can be used to energize this kickout relay to thereby de-energize the appliance whenever the cabinet is supported on the caster wheels, and maintain the appliance de-energized until the kickout relay is reset.

BRIEF DESCRIPTION OF THE DRAWINGS

FIG. 1 is a view in perspective and partly in phantom illustrating a laundry appliance being supported on a caster jack mechanism and embodying the switch means of the present invention; and FIG. 2 is a fragmentary wiring diagram of the machine control circuit of the appliance of the present invention.

DESCRIPTION OF THE PREFERRED EMBODIMENTS

For purposes of simplicity and illustration, FIG. 1 of the drawings illustrates somewhat schematically an automatic washer assembly without the internal mechanism. In FIG. 1, reference numeral 10 indicates generally a cabinet of generally rectangular configuration, provided with a hinged access door 11 and spaced control knobs 12 and 13 initiating operation of the device and also for setting the appropriate cycle through which the machine is to operate.

The caster jack mechanism includes a shaft 14 extending across the width of the cabinet 10 and having its ends journaled for rotation in opposed walls of the cabinet. Secured to the shaft 14 in spaced relation is a pair of caster wheels 15 and 16. Between the two caster wheel assemblies 15 and 16 there is a collar 17 which is rigidly secured to the shaft 14. The collar 17 carries a bevel gear 18. The bevel gear 18 is arranged to mesh with a bevel gear 19 forming part of a collar 20 which is secured by means of bolts or the like to a shaft 21 extending generally perpendicularly to the shaft 14. The shaft 21 is provided with a goose neck portion 22 to permit the bevel gears 18 and 19 to mesh completely.

An end 23 of the shaft 21 is received for rotation within a bearing assembly (not shown) formed in one of the walls of the cabinet 10. The opposite end 24 of the shaft 21 is also journaled for rotation in the opposed side wall of the cabinet. Intermediate the ends of the shaft 21 is a pivotal caster wheel 25 mounted on a plate 26 which is rigidly secured to the shaft 21. The three caster wheels 15, 16 and 25 thus provide a three point suspension for supporting the entire weight of the cabinet when the shafts 14 and 21 are jointly rotated so that the caster wheels engage the floor surface and lift the cabinet off the floor.

Joint rotation of the two shaft assemblies is accomplished by means of a pedal actuated mechanism having an arm 27 with one end welded or otherwise secured to the shaft 21. Secured to the opposite end of the arm 27 is a pedal 28 which extends into a recess 29 formed in one wall of the cabinet. Thus, joint rotation of the shafts 14 and 21 may be accomplished by merely applying foot pressure to the pedal 28, causing the bevel gears 18 and 19 to lower the caster wheels and apply the weight of the cabinet on the wheels. Suitable latch and spring means (not shown) of the type illustrated in the aforementioned Ser. No. 29,389 may be used to lock the pedal assembly into the cabinet raising position of the caster jack mechanism.

When the pedal 28 is operated, rotation of the shaft 14 causes a position sensitive switch 30 mounted on a bracket 31 to the shaft 14 to close. Typically, the switch 30 may be a mercury switch which, when tilted beyond a certain angle, operates to establish electrical continuity between a pair of electrodes in the switch. A pair of leads 32 and 33 connect the switch 30 to the other portions of the electrical circuit.

Referring now to FIG. 2, electrical lines 34 and 35 apply a suitable energizing voltage to the washing machine assembly. A main switch 36, when closed, applies energizing voltage across a timer motor 37 which controls all of the functions of the machine in accordance with a programmed sequence, depending on the type of fabric being laundered.

The particular circuit shown in FIG. 2 includes a kickout relay coil 38 which acts on a normally closed vibration sensitive relay contact 39. When the machine is operating normally, that is, in the absence of excess vibration, the relay contact 39 remains in contact with terminal 41 and the machine goes through its normal programmed sequence. If, however, excessive vibration should occur, the vibration sensitive contact 39 moves from the lower terminal 41 shown in FIG. 2 to the upper terminal 42, thereby energizing the relay coil 38 and holding the contact 39 in the upper position. The circuit may also be provided with a separate buzzer 40 in series with the relay coil 38 to provide an audible indication to tell the operator that malfunction of the machine exists. It is not always necessary to provide a separate buzzer 40 as the relay coil 38 and the contact 39 may be designed as a chattering relay device which itself provides an audible signal when energized.

The position sensitive switch 30 is in series with the kickout relay coil 38. When the cabinet is supported on the caster wheels, the switch 30 is closed, thereby energizing the relay coil 38, moving the relay contact 39 to the upper terminal 42 and thereby deenergizing the circuitry. Operation of the timer motor 37 and the other control mechanisms in the control circuit are thereby prevented until such time as the machine is lowered to the floor and the caster wheels retracted, whereupon the switch 30 opens. Reenergization of the machine is accomplished by opening main switch 36 deenergizing coil 38 thus allowing contact 39 to re-engage terminal 41 to permit the machine to be energized when switch 36 is reclosed.

It will be seen from the foregoing that the control of the present invention prevents energization of the main control circuit of the appliance and provides an audible alarm until such time as the cabinet is again lowered to the floor level by retraction of the caster jack mechanism, and the kickout relay is reset by opening and reclosing main switch 36.

While the invention has been described in conjunction with one particular caster jack mechanism, it is to be understood that it has equal utility with other types of such mechanisms.

The embodiments of the invention in which an exclusive property or privilege is claimed are defined as follows:

1. A lockout for a portable appliance having a caster jack mechanism and means energizable to perform an operating cycle of the appliance, comprising:
   a cabinet having a supporting base and a recessed cabinet portion;
   first and second shafts supported by said cabinet for rotative movement and drive means connecting said shafts for rotating said first shaft in response to rotation of said second shaft;
   actuating means connected to said second shaft including a lever mechanism connected to said second shaft and a foot pedal connected to said lever and disposed in said recessed portion for access by an operator;
   a plurality of caster wheels disposed in spaced relation along said first and second shafts, said caster wheels being pivotable into cabinet supporting relation upon rotation of said first and second shafts in one direction;
   switch means carried by one of said shafts and actuated by rotation in said one direction; and
   safety means operated by said switch means including means interposed between said energizable means and an electrical supply to prevent energization of said operating means upon actuation of said switch means so that the appliance may not be operated unless supported by said supporting base.

2. The lockout according to claim 1, wherein said safety means includes an audible signal means operated by the actuation of said switch means.

3. The lockout according to claim 1, wherein said switch means includes a position sensitive switch.

4. The lockout according to claim 1, wherein said switch means includes a position sensitive switch and said safety means includes a relay having a coil connected in circuit with said switch and the electrical supply and a set of contacts interposed between the electrical supply and said operating means.

5. The lockout according to claim 4, wherein said relay is a kickout relay which is normally mechanically operated upon excessive vibration.

* * * * *